United States Patent [19]
Whitesell

[11] Patent Number: 5,537,624
[45] Date of Patent: Jul. 16, 1996

[54] DATA REPACKING CIRCUIT HAVING TOGGLE BUFFER FOR TRANSFERRING DIGITAL DATA FROM P1Q1 BUS WIDTH TO P2Q2 BUS WIDTH

[75] Inventor: Eric J. Whitesell, San Diego, Calif.

[73] Assignee: The United States of America as represented by the Secretary of the Navy, Washington, D.C.

[21] Appl. No.: 654,857

[22] Filed: Feb. 12, 1991

[51] Int. Cl.[6] ........................................ G06F 13/38
[52] U.S. Cl. ................ 395/872; 395/250; 395/500
[58] Field of Search .................... 395/250, 500, 395/872

[56] References Cited

U.S. PATENT DOCUMENTS

| | | | |
|---|---|---|---|
| 4,228,496 | 10/1980 | Katzman et al. | |
| 4,261,035 | 4/1981 | Raymond. | |
| 4,315,312 | 2/1982 | Schmidt. | |
| 4,319,323 | 3/1982 | Ermolovich et al. | |
| 4,356,550 | 10/1982 | Katzman et al. | |
| 4,407,016 | 9/1983 | Bayliss et al. | |
| 4,447,876 | 5/1984 | Moore | 395/500 |
| 4,633,437 | 12/1986 | Mothersole et al. | 395/250 |
| 4,654,787 | 3/1987 | Finnell et al. | |
| 4,683,534 | 7/1987 | Tietjen et al. | |
| 4,716,527 | 12/1987 | Graciotti | 395/500 |
| 4,766,538 | 8/1988 | Miyoshi. | |
| 4,831,514 | 5/1989 | Turlakov et al. | 395/500 |
| 4,845,611 | 7/1989 | Turlakov et al. | 395/250 |
| 4,860,198 | 8/1989 | Takenaka. | |
| 5,045,998 | 9/1991 | Begun et al. | 395/375 |
| 5,055,661 | 10/1991 | Gochi | 235/492 |
| 5,073,969 | 12/1991 | Shoemaker. | |
| 5,113,369 | 5/1992 | Kinoshita. | |

OTHER PUBLICATIONS

MC68020 User's Manual; Motorola; pp. 7–5 to 7–22.

*Primary Examiner*—Krisna Lim
*Attorney, Agent, or Firm*—Harvey Fendelman; Michael A. Kagan; Peter A. Lipovsky

[57] ABSTRACT

A method implemented in hardware logic for transforming data from one bus width to another includes the steps of: 1) selectively latching data having p1 words each having a q1 width, where p1 and q2 are positive integers; and 2) selectively buffering the latched data as p2 words each having q2 bits, where p1q1=p2q2, and p2 and q2 are positive integers. The present invention also provides an electrical circuit for transforming a series of data having a first width into a series of data having a second width. A toggle buffer having a plurality of data latches selectively latches data having p1 words each having a q1 width, and buffers the latched data as p2 words each having q2 bits, where p1q1=p2q2, and p1, p2, q1, and q2 are positive integers. An input selector is coupled to the toggle buffer so as to provide a series of latching strobes to a first sequence of the latches. The input selector directs the data to be stored as p1 words, each word having q1 bits. An output selector is coupled to the toggle buffer for selectively enabling a second sequence of the latches so as to direct the toggle buffer to buffer the stored data as p2 words, each word having q2 bits.

7 Claims, 17 Drawing Sheets

DATA REPACKING CIRCUIT HAVING TOGGLE BUFFER FOR TRANSFERRING DIGITAL DATA FROM P1Q1 BUS WIDTH TO P2Q2 BUS WIDTH

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of data transfer, and more particularly, to a method for buffering data between two asynchronous data buses having different widths.

There are many applications where it is necessary to transfer data from one asynchronous device to another, where each device has a different bus width. For example, a typical application where this situation arises is the case where it is necessary for a computer to transfer 16-bit words to a peripheral device that only accepts 12-bit words. The 16-bit word output of the computer must be repacked into 12-bit words. This requires different data word transfer rates for each data bus so that the peripheral device will be able to accept the data.

The conventional method of repacking data uses a CPU and software. The CPU must have sufficient speed to keep up with the input source data rate, and a data path that does not interfere with other system tasks being performed. In the case of some VME bus systems, the data paths are already fully utilized, and a medium-priced CPU is not fast enough to repack data at input source data rates approaching 2 Mb/sec.

Thus, there is a need for a method for repacking data that uses hardware logic, rather than software running on a CPU.

SUMMARY OF THE INVENTION

The present invention provides a method implemented in hardware logic for buffering and resizing output data between data buses of different widths. This method includes the steps of: 1) selectively latching data having p1 words each having q1 bits, where p1 and q2 are positive integers; and 2) selectively buffering the latched data as p2 words, where each word has q2 bits, where p1q1=p2q2, and p2 and q2 are positive integers.

The present invention also provides an electrical circuit for transforming a series of data having a first width into a series of data having a second width. A toggle buffer having a plurality of data latches selectively latches data having p1 words each having a q1 width, and buffers the latched data as p2 words each having q2 bits, where p1q1=p2q2, and p1, p2, q1, and q2 are positive integers. An input selector is coupled to the toggle buffer so as to provide a series of latching strobes to a first sequence of the latches. The input selector directs the data to be stored as p1 words, each word having q1 bits. An output selector is coupled to the toggle buffer for selectively enabling a second sequence of the latches so as to direct the toggle buffer to buffer the stored data as p2 words, each word having q2 bits.

The present invention overcomes the shortcomings of the speed and cost limitations inherent in running software on a CPU in order to adapt one data bus width to another, especially at data rates in excess of 1 Mb/sec. One specific example by which the present invention may be implemented is presented and described herein as latching input data at the rate of six 16 bit words at a time and outputting the same bit sequence at the rate of eight 12 bit words at a time. However, it is to be understood that this method by be readily adapted to repack data from any size to any other size, as required for a particular application.

DESCRIPTION OF THE PREFERRED EMBODIMENT

Figure 1:
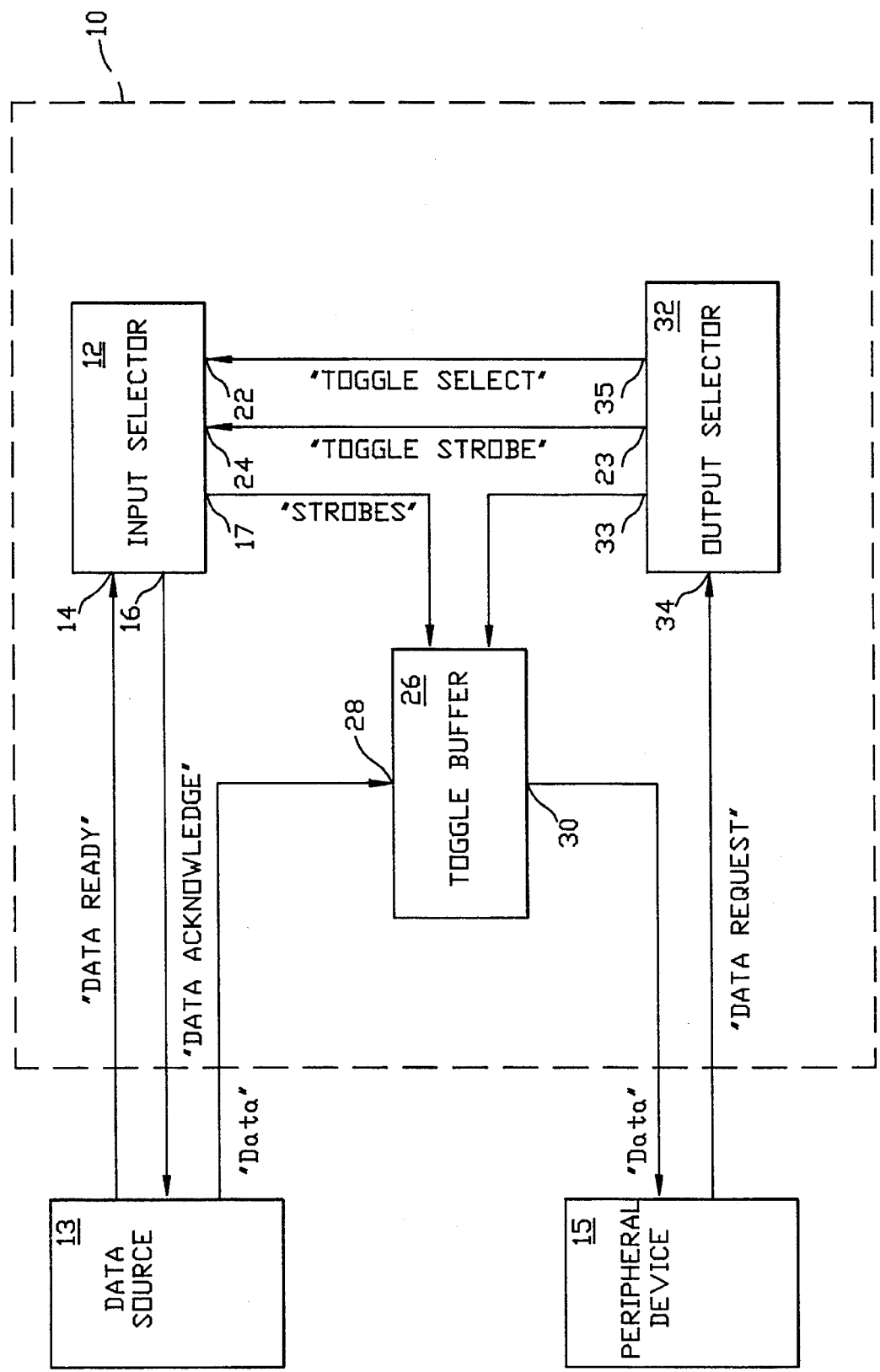
FIG. 1 is a block diagram of one means of implementing the method of the present invention for buffering and resizing data.

Referring to FIG. 1, there is illustrated data repacking circuit 10 for buffering data between two asynchronous data buses having different widths, generally consisting of input selector 12, toggle buffer 26, and output selector 32, all described in greater detail further herein. By way of example, circuit 10 is shown to receive data having a specific width provided by data source 13 and repack it to a different width suitable for being received by peripheral device 15. Operation of circuit 10 begins with data source 13 presenting data through data input 28 of toggle buffer 26, and a "data ready" signal to input 14 of input selector 12.

The "data ready" signal tells input selector 12 that data source 13 is ready to send additional data. Upon receipt of the "data ready" signal, input selector 12 asserts a "data acknowledge" signal through output 16 to data source 13. The "data acknowledge" signal tells data source 13 to present data to toggle buffer 26. At this time, input selector 12 provides address strobes through address lines 17 to toggle buffer 26 so that toggle buffer 26 latches the data through input 28 into toggle buffer 26. When input selector 12 sends the last data strobes to toggle buffer 26, input selector 12 negates the "data acknowledge" signal provided through output 16 until toggle buffer 26 is ready for more data. Meanwhile, output selector 32 provides data strobes through output 33 to toggle buffer 26 in response to each "data request" signal provided from peripheral device 15 to input 34 of output selector 32 which then directs toggle buffer 26 to unload data through output 30 to the peripheral device 15, as shown in FIG. 1.

Toggle buffer 26 latches input data while simultaneously repacking and buffering output data. When output selector 32 sends the last data strobe upon disablement of the "data request" signal, output selector 32 provides a "toggle strobe" through output 23 which signals input selector 12 to reassert the "data acknowledge" signal through output 16. The process then is repeated, i.e., loading a sequence of data from the input data source into toggle buffer 26, which repacks the data, and then presenting another sequence of data to peripheral device 15.

Implementation of the present invention requires an output data source 13 having a parallel data interface and a "data ready" output to indicate when new data has stabilized on the data bus of data input 28, and a peripheral device for receiving data that provides a "data request" output.

Figure 2:
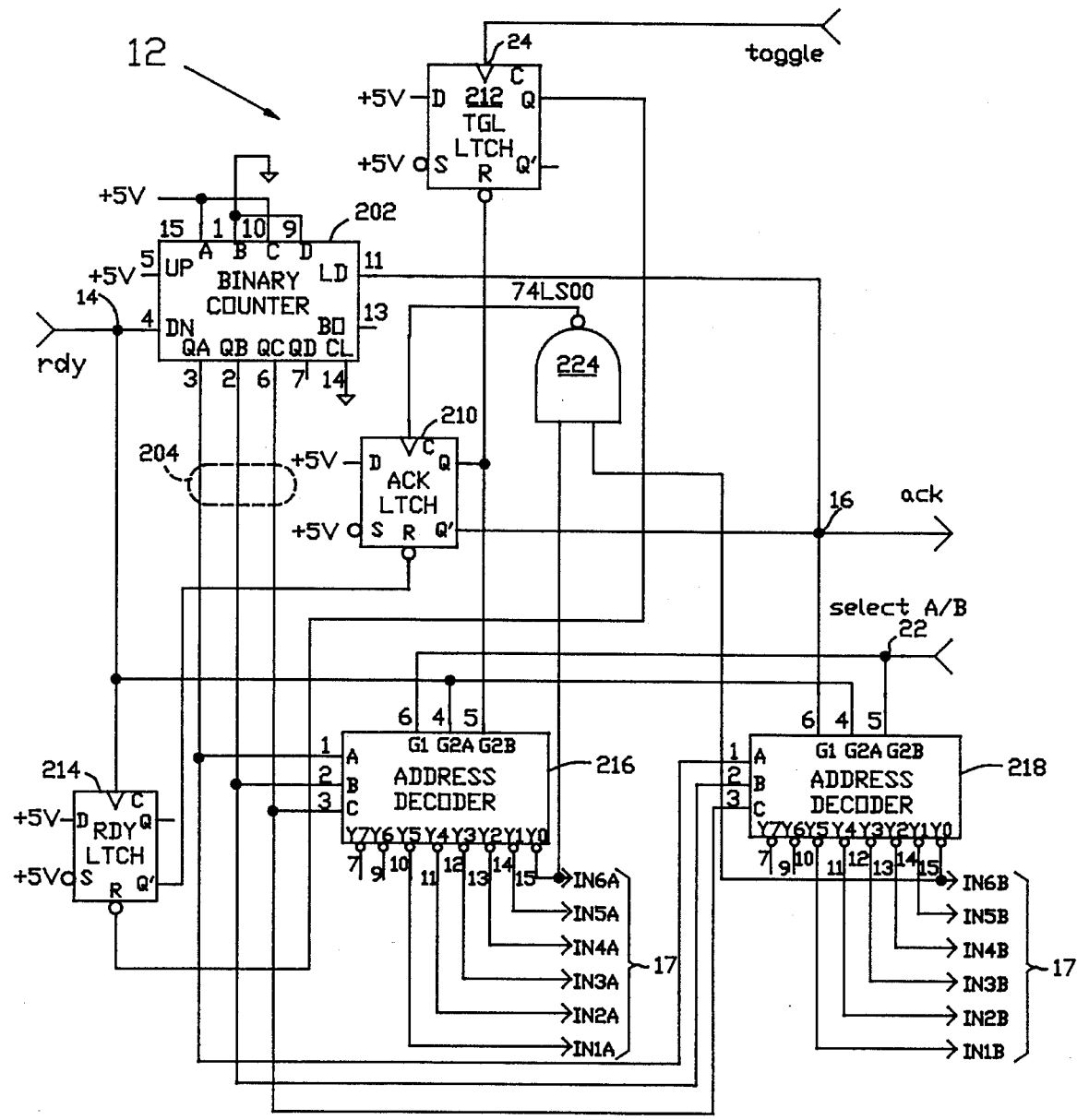
FIG. 2 is a functional diagram of input selector 12 which loads and acknowledges the data from the output source into the toggle buffer.

Input Selector:

Referring to FIG. 2, a "data ready" signal, provided from data source 13 through input 14, is presented to binary counter 202 (Part Number CD40193) of input selector 12. Binary counter 202 presents address decoders 216 and 218 (Part Number 74LS138) with the address of the "next latch" through lines 204 in response to receiving each "data ready" signal through input 14. Address decoders 216 and 218 present address strobe signals 17 to toggle buffer 26 (FIG. 1) through the address strobe lines 17, one at a time. Binary counter 202 sets each of the input word address lines 204 to the values 0, 1, 2, 3, 4, and 5, respectively, every time binary counter 202 receives a "data ready" signal through input 14. When binary counter 202 has counted down to zero, the address strobe 17 provided by one of alternately enabled address decoders 216 or 218 is inverted by NAND gate 224 so as to clock acknowledge latch 210 (Part Number 74LS74). This assures that the last address decoder strobe is long enough to latch the data into toggle buffer 26. Once clocked, acknowledge latch 210 disables both address decoders 216 and 218 to prevent overwriting the data in toggle buffer 26 and enables toggle latch (Part Number 74LS74) to receive a toggle strobe through input 24, signalling that toggle buffer 26 is empty. Toggle latch 212 enables ready latch 214 so that the next "data ready" signal provided through input 14 clocks ready latch 214 (Part Number 74LS74). This causes ready latch 214 to reset acknowledge latch 210, which in turn resets toggle latch 212 and ready latch 214 to their previous states so that the cycle may be repeated.

Input address decoders 216 and 218 each receive the same "toggle select" signal through input 22, but only one is enabled at a time, depending on the state of "toggle select" signal provided through input 22. Address lines 204 are sequentially decoded by enabled address decoder 216 or 218, providing a data latch strobe to input 29 or toggle buffer 26.

Implementation of the present invention requires adherence to the following relations:

$$N_{in}W_{in}=W_{out}N_{out} \quad (1)$$

where:

$W_{in}$=the width of words presented to data input 28;

$W_{out}$=the width of words presented to data output 30;

$N_{out}$=the number of words presented to output 30 of toggle buffer 26;

$N_{in}$=the number of words presented to data input 14; and $$B_{in}N_{in}=B_{out}N_{out} \quad (2)$$

where:

$B_{in}$=the number of bits presented to data input 28;

$N_{in}$=the number of words presented to data input 28;

$B_{out}$=the number of bits presented to data output 30; and $N_{out}$=the number of words presented to data output 30.

Figure 3:
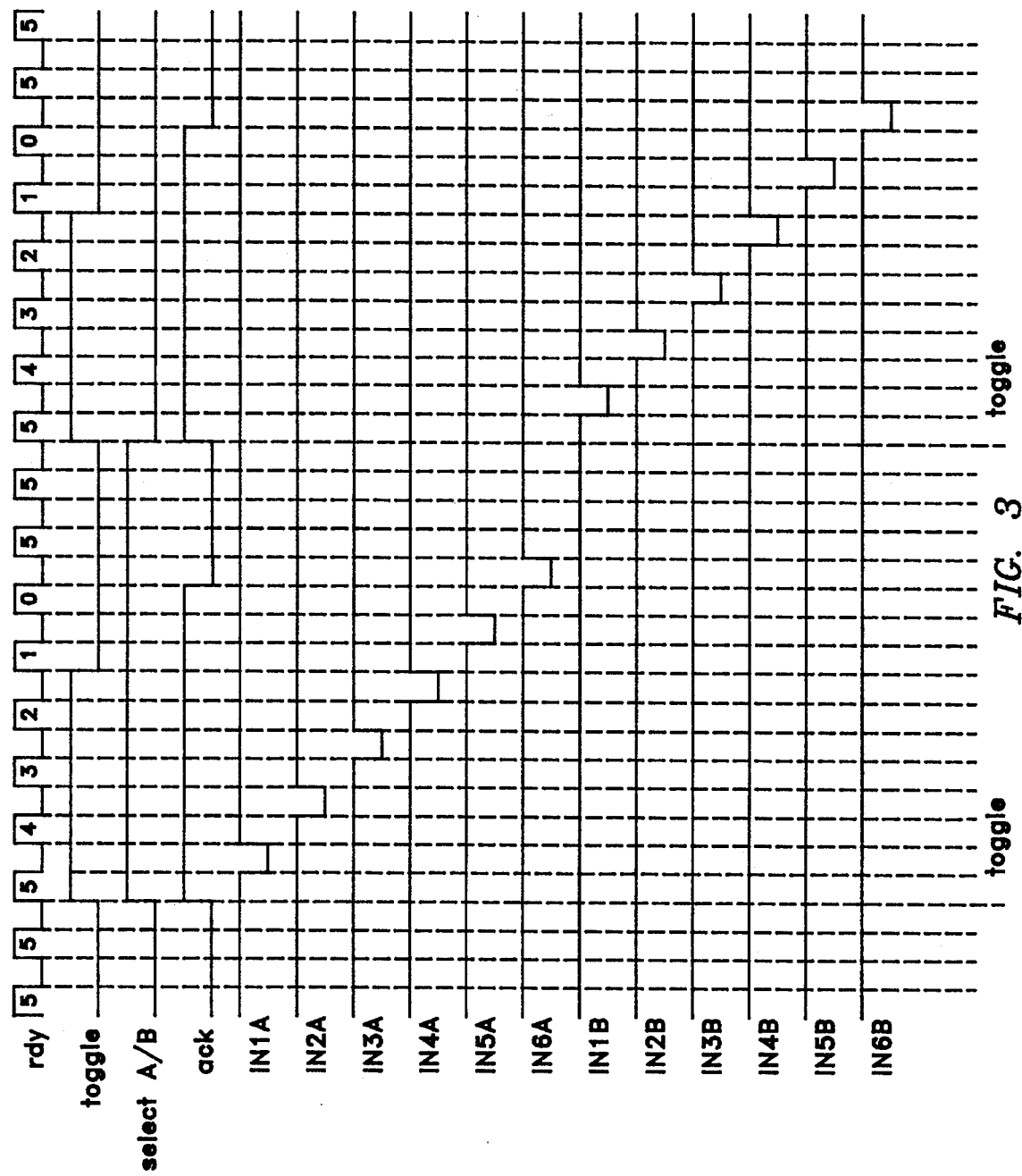
FIG. 3 is a timing diagram of input selector 12 which shows the sequence of input data control.

Satisfying equations (1) and (2) assures that the same number of bits are both input and output to and from toggle buffer 26 per unit time, thus forming a common denominator for repacking the data. The data is stored in toggle buffer 26 comprised of multiple arrays 500 of latches 505, as shown in FIGS. 6A–6L. In this implementation, six 16-bit words are repacked into eight 12-bit words. FIG. 3 is a conventional sequential logic timing diagram illustrating the sequence explained above for a complete cycle for storing input data provided as six, 16-bit words.

Figure 4:
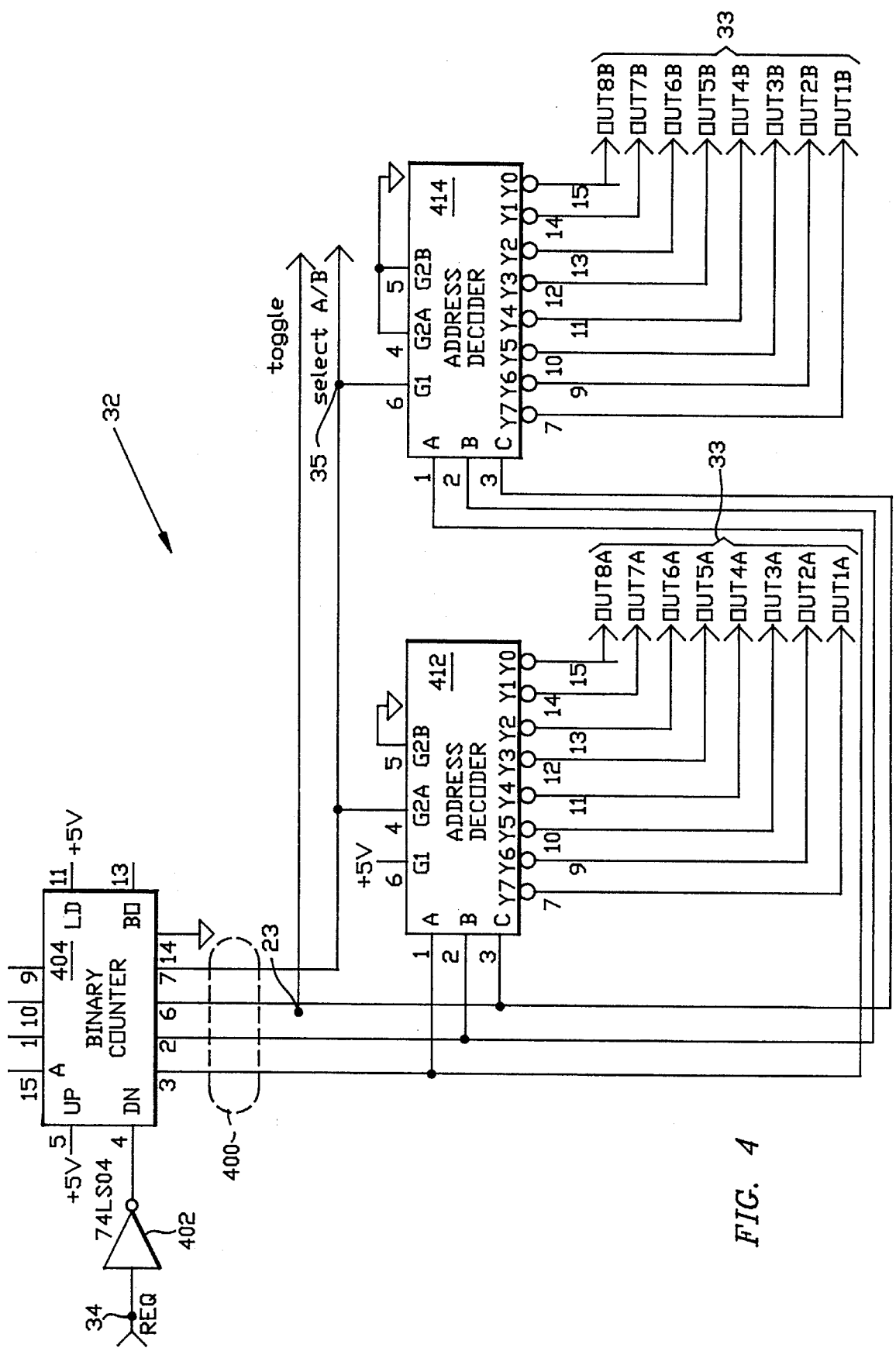
FIG. 4 is a functional diagram of output selector 32 which unloads data from the toggle buffer to the data output.
Figure 5:
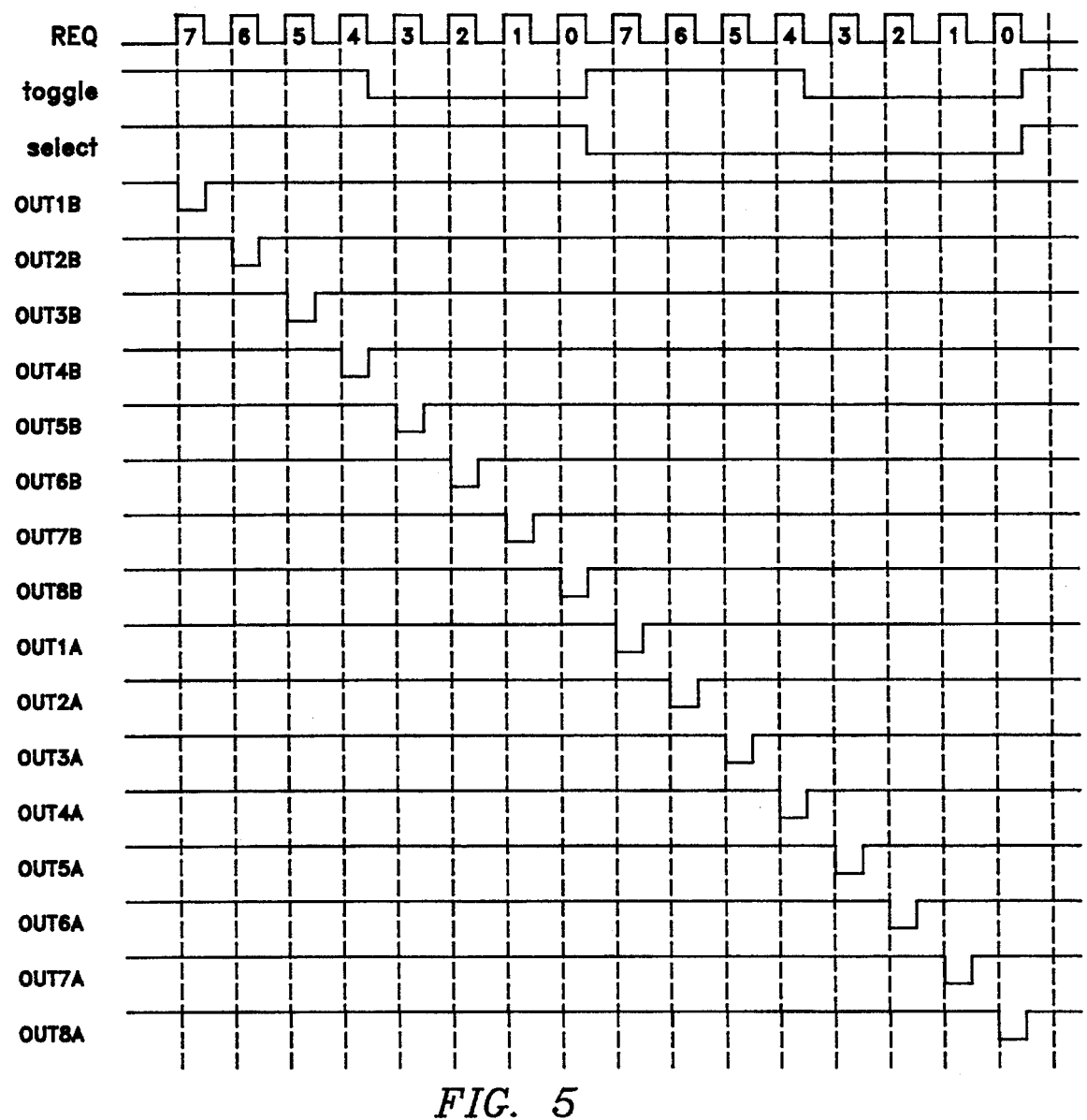
FIG. 5 is a timing diagram of output selector 32 which shows the sequence of output data control.
Figure 6A:
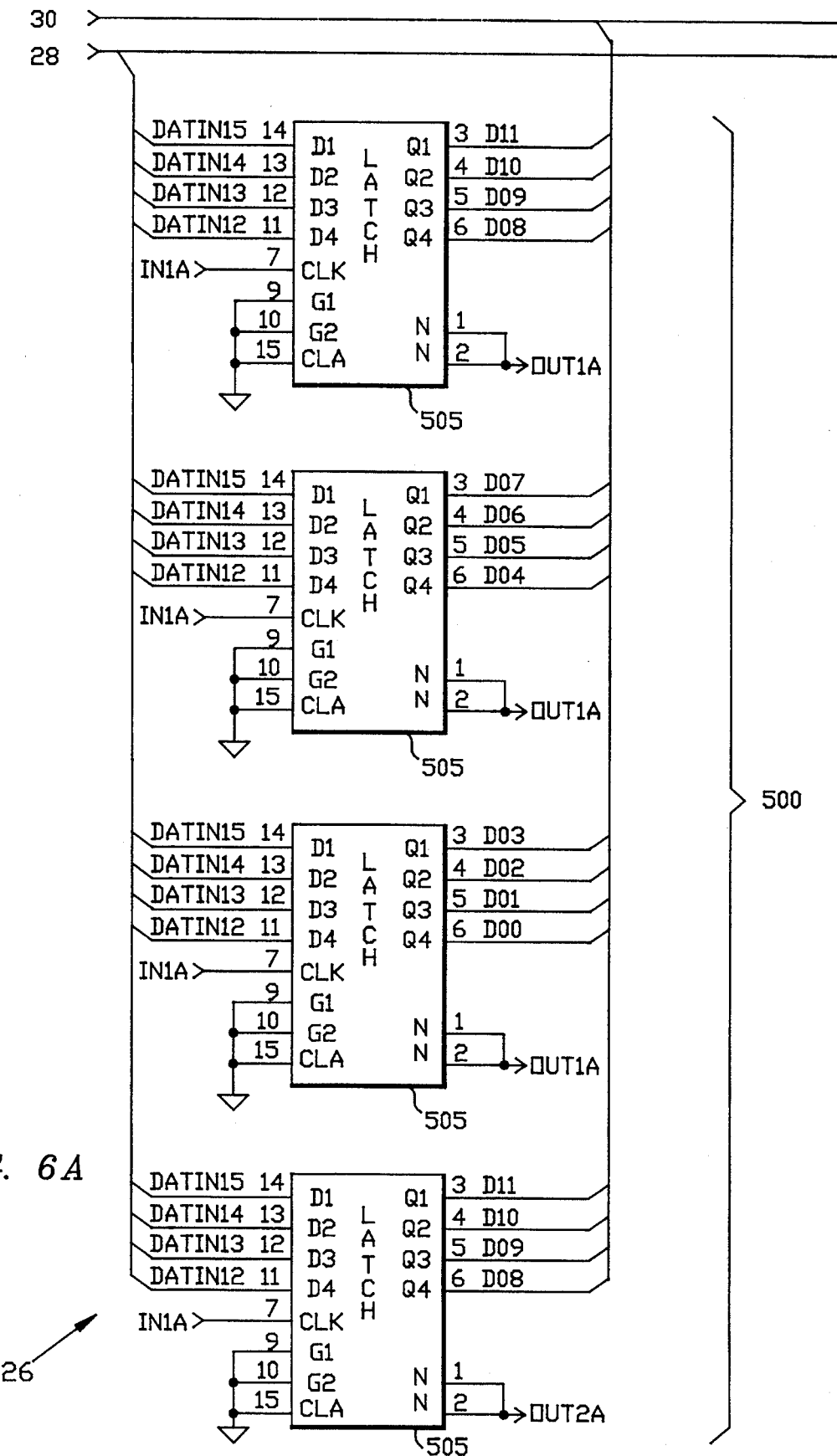
FIGS. 6A, 6B, 6C, 6D, 6E, 6F, 6G, 6H, 6I, 6J, 6K, and 6L collectively illustrate an example of toggle buffer 26, which latches input data 28 in one bus width and buffers output data 30 in a different bus width.
Figure 6B:
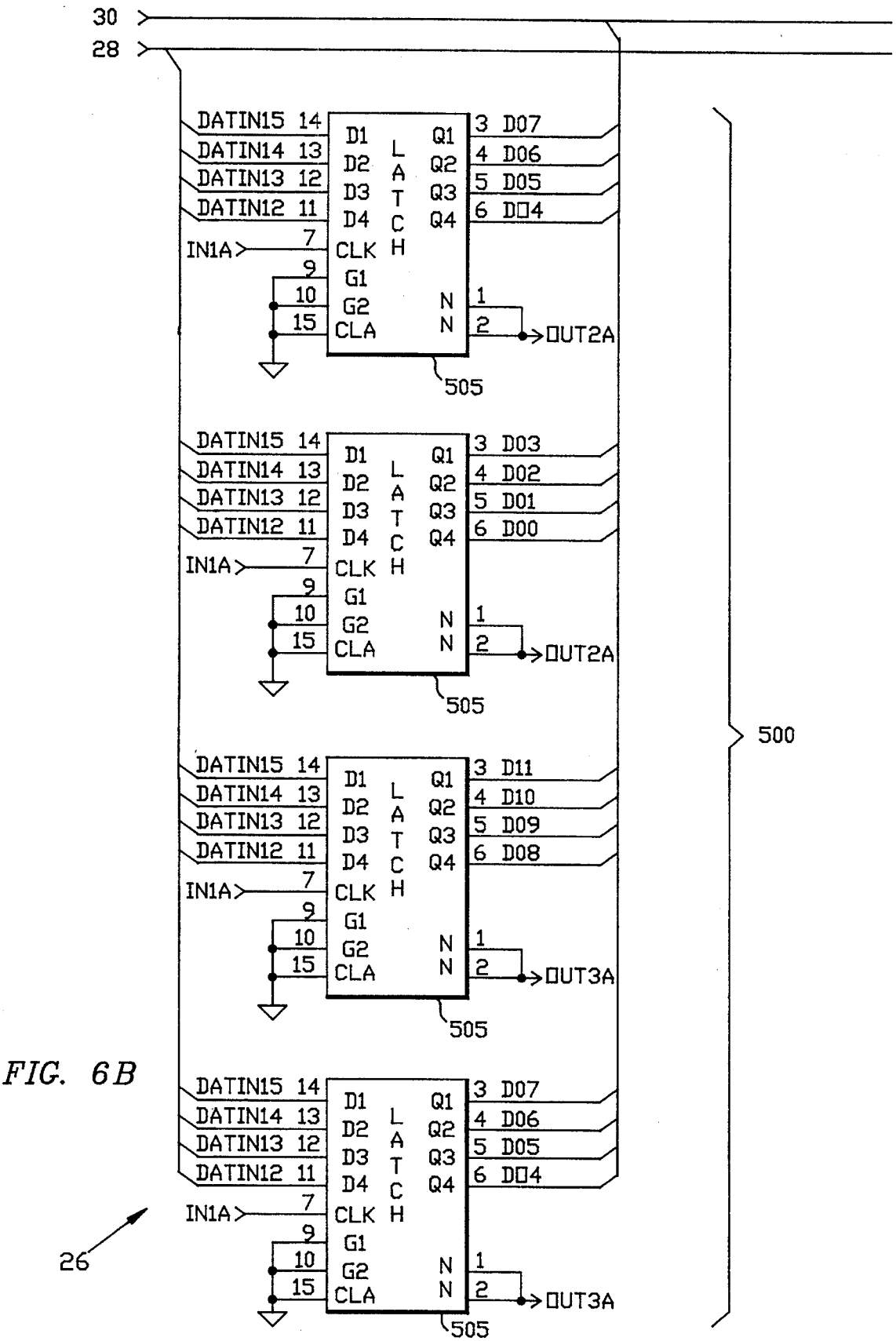
Figure 6C:
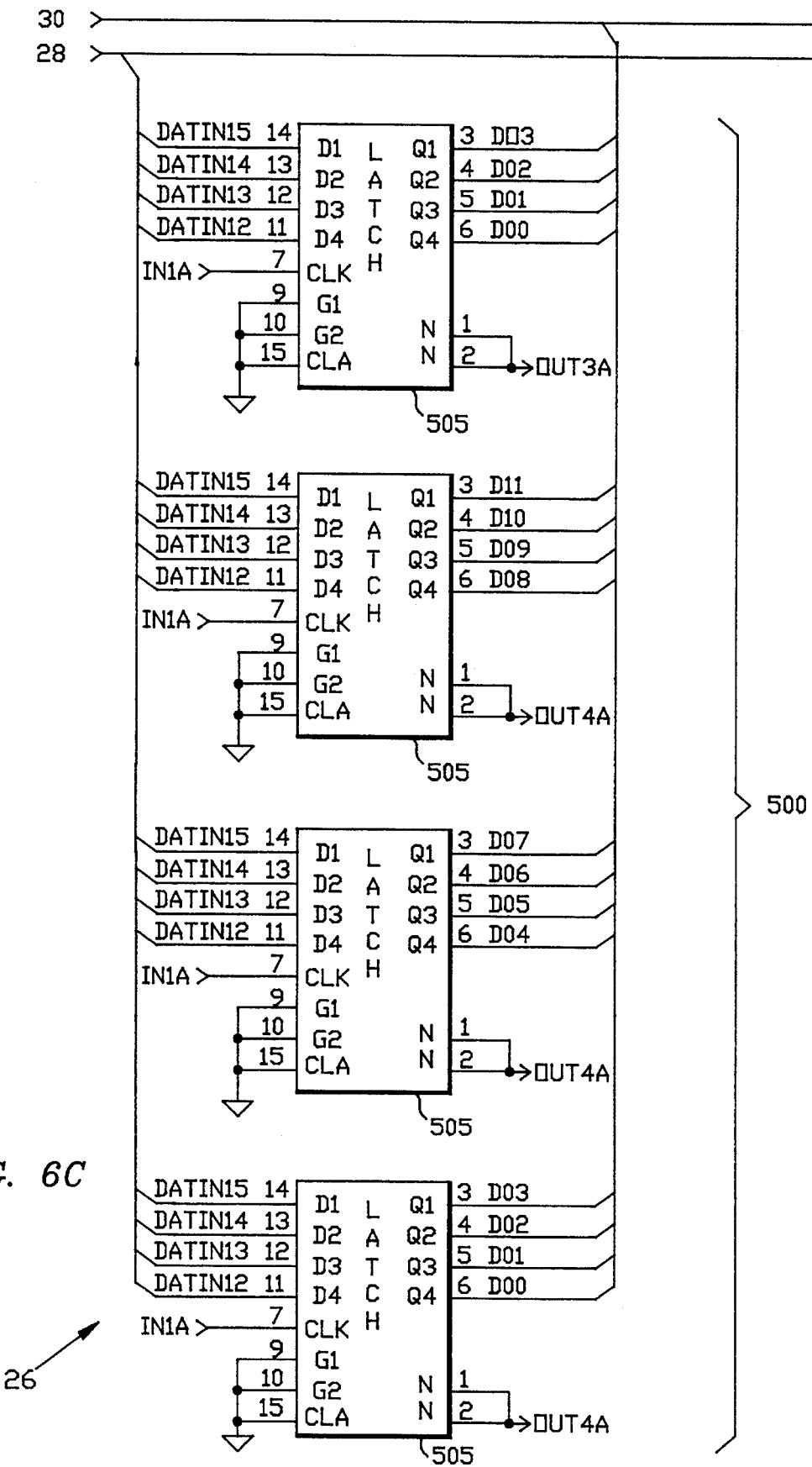
Figure 6D:
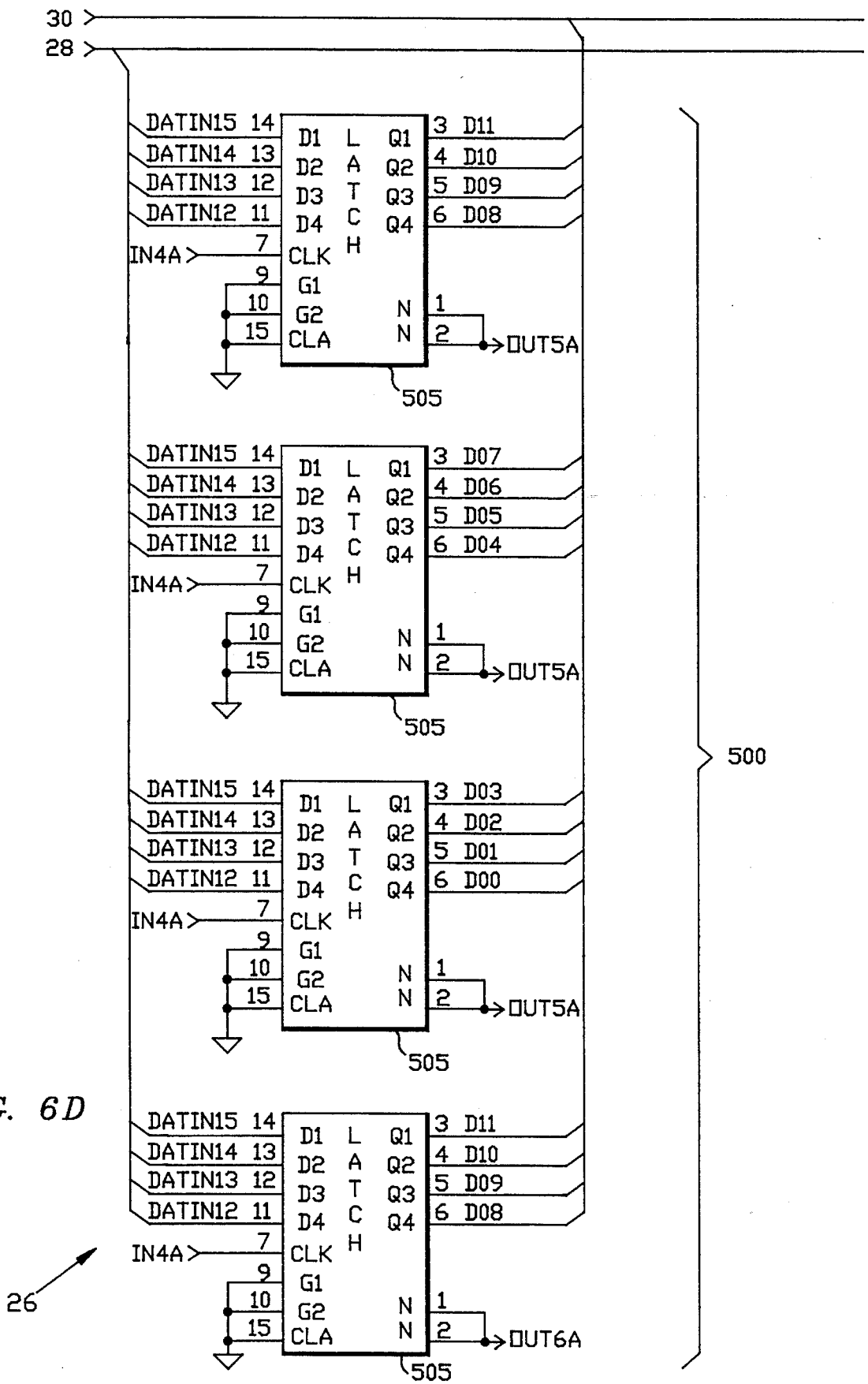
Figure 6E:
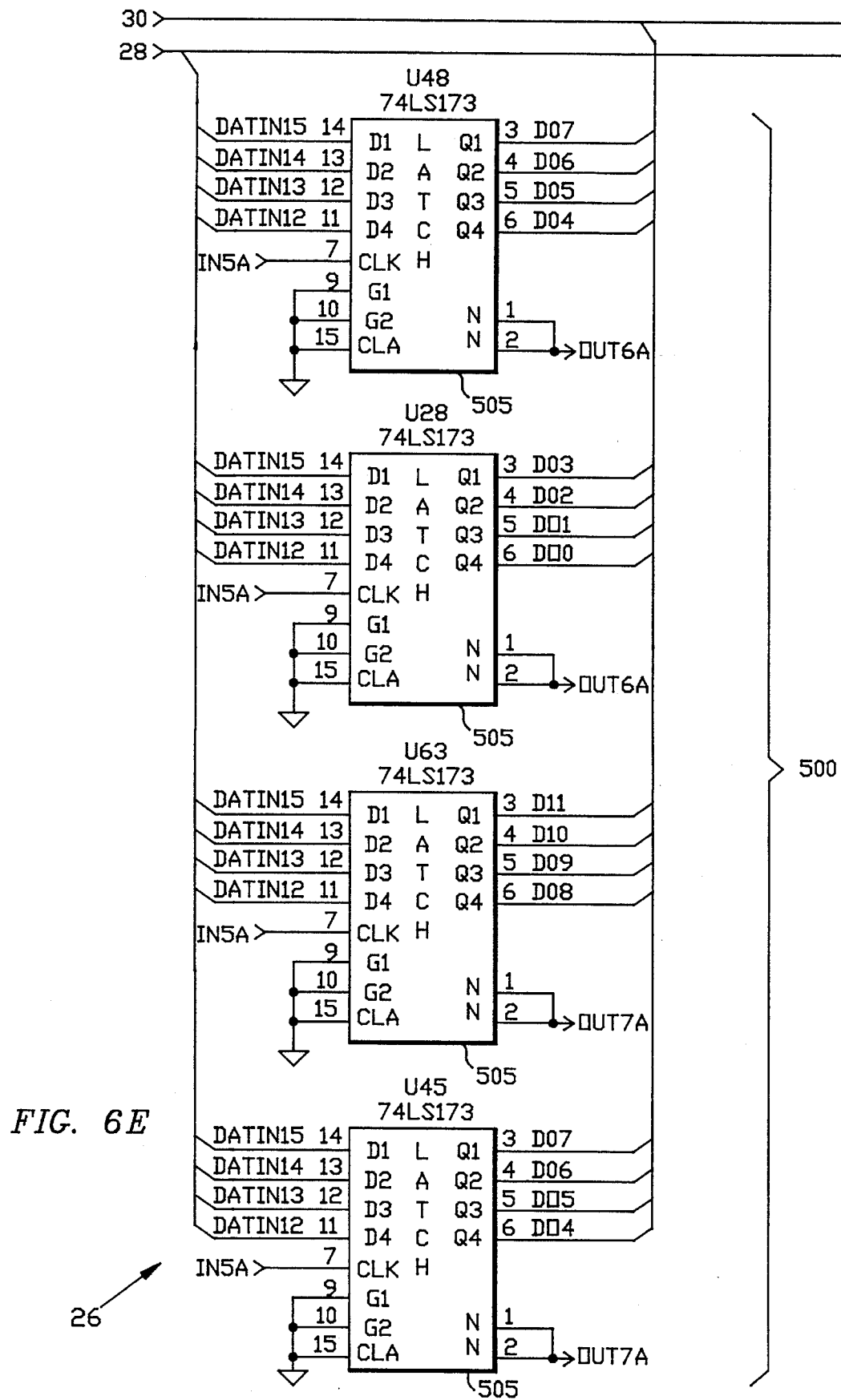
Figure 6F:
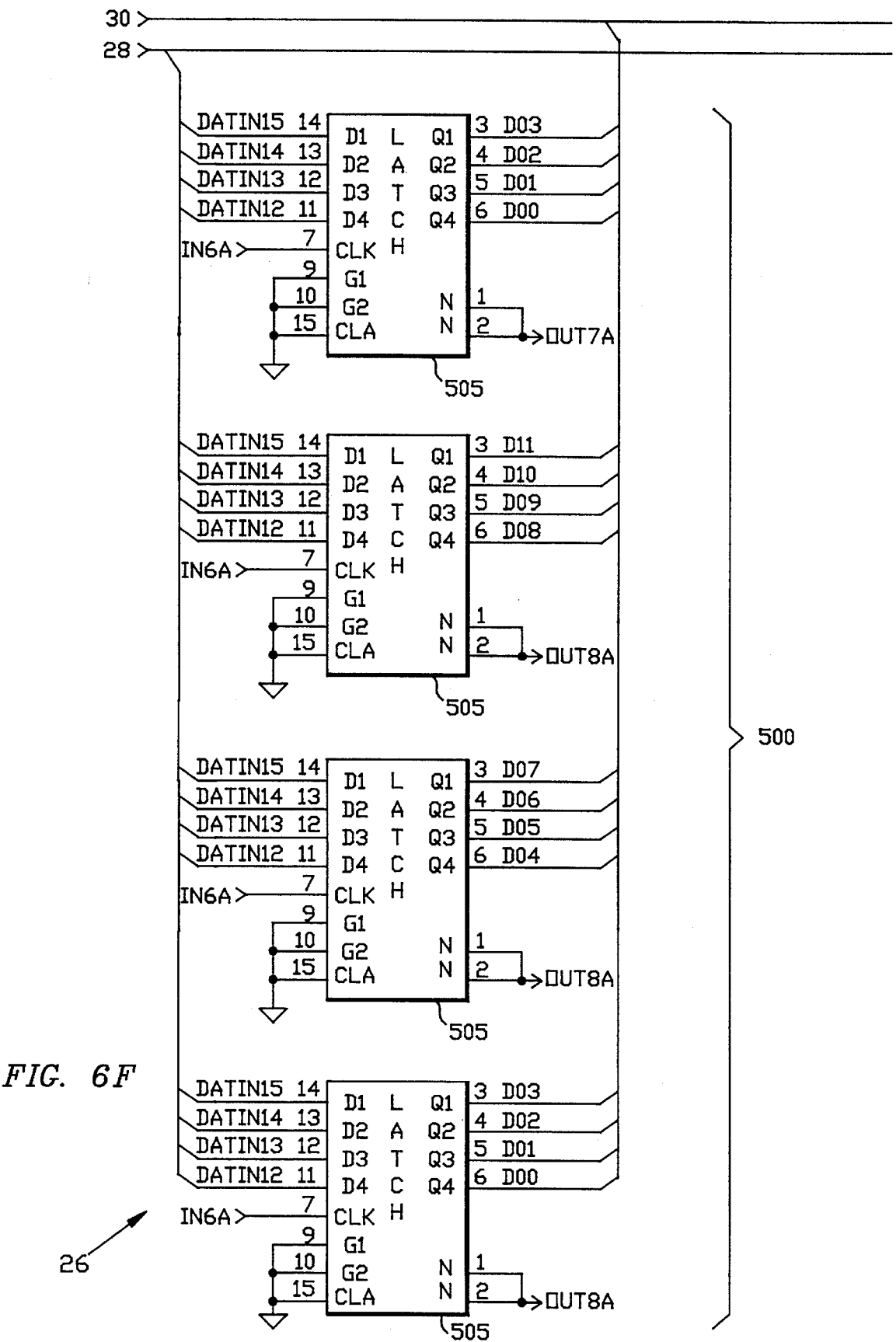
Figure 6G:
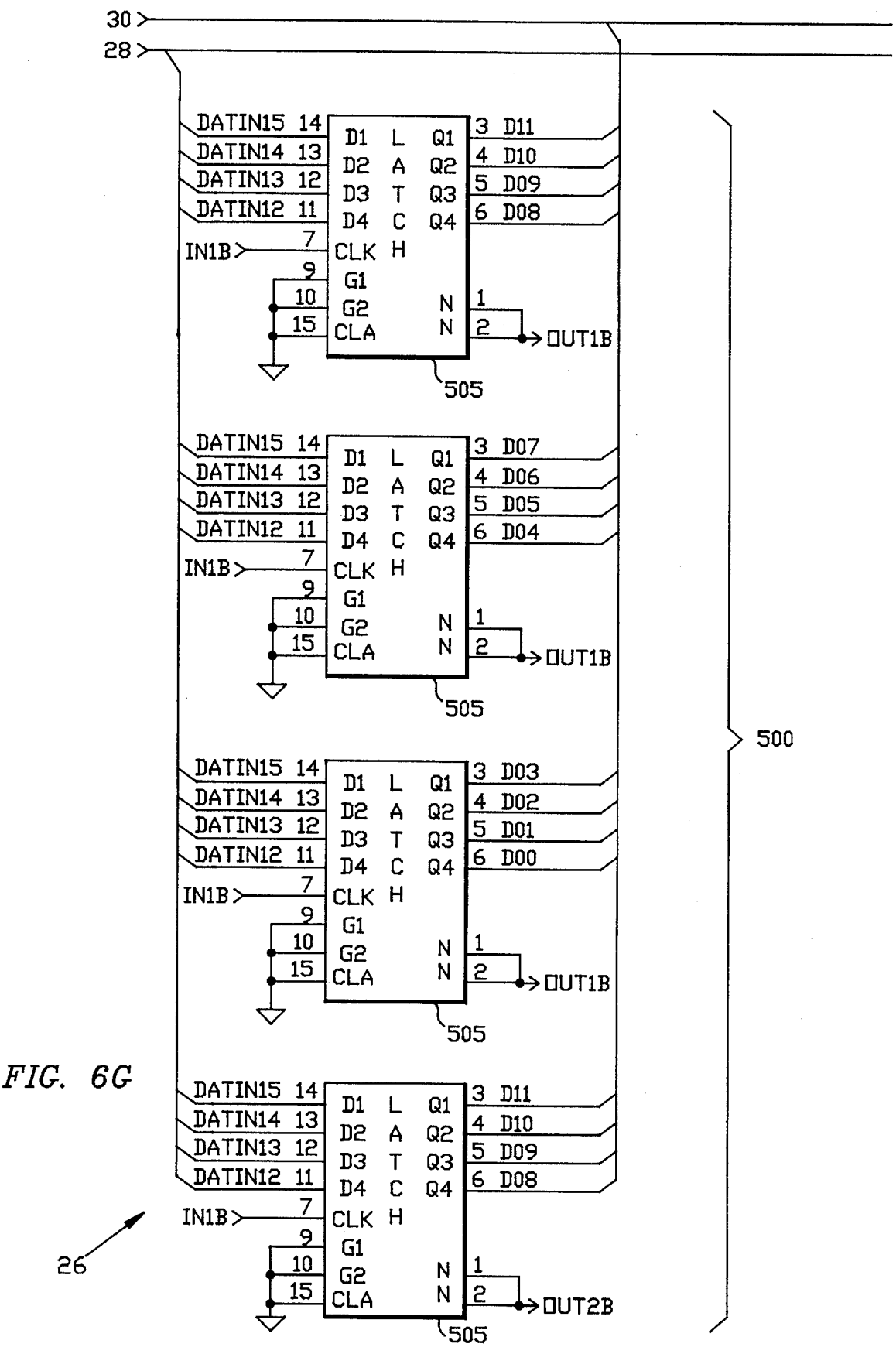
Figure 6H:
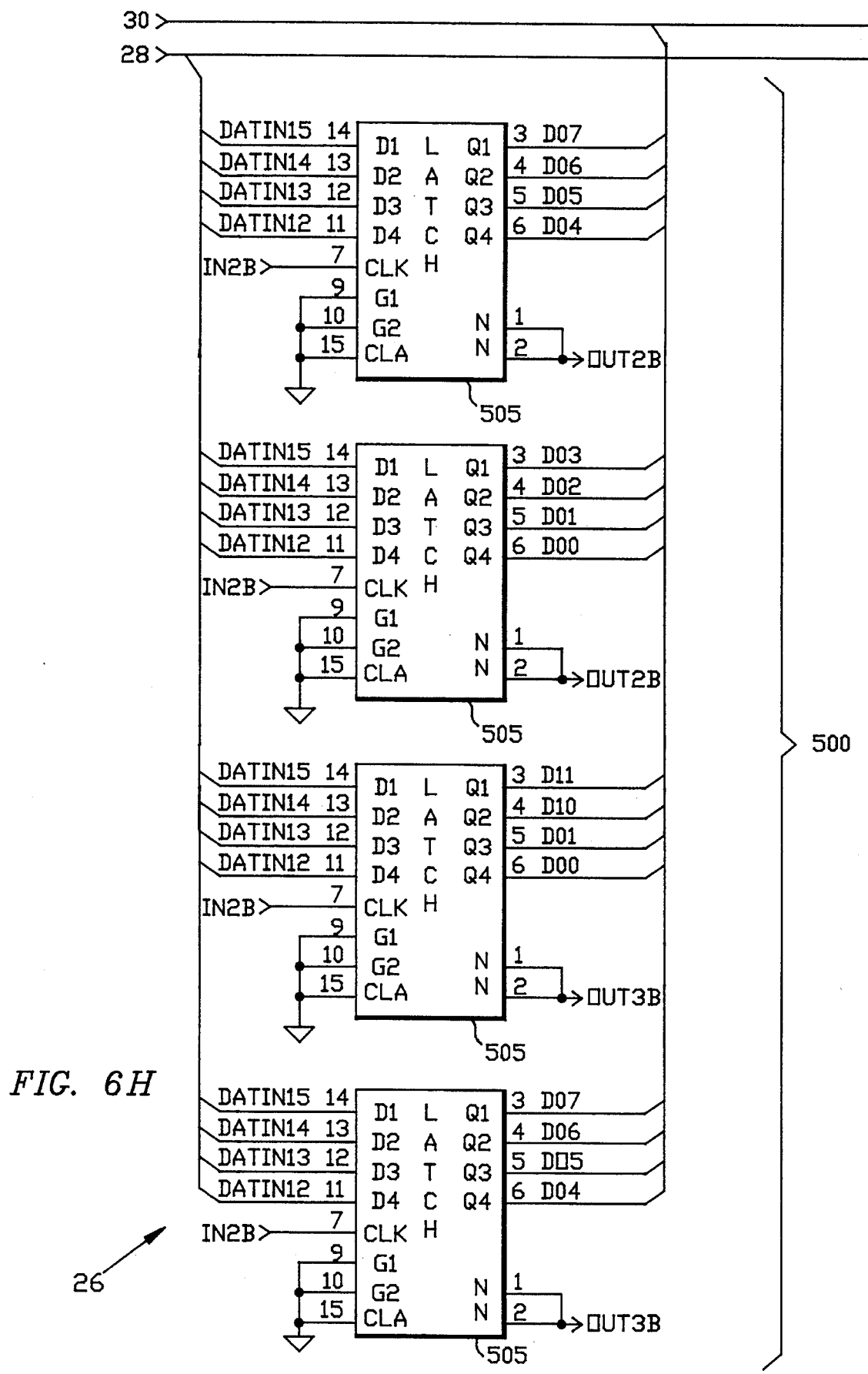
Figure 6I:
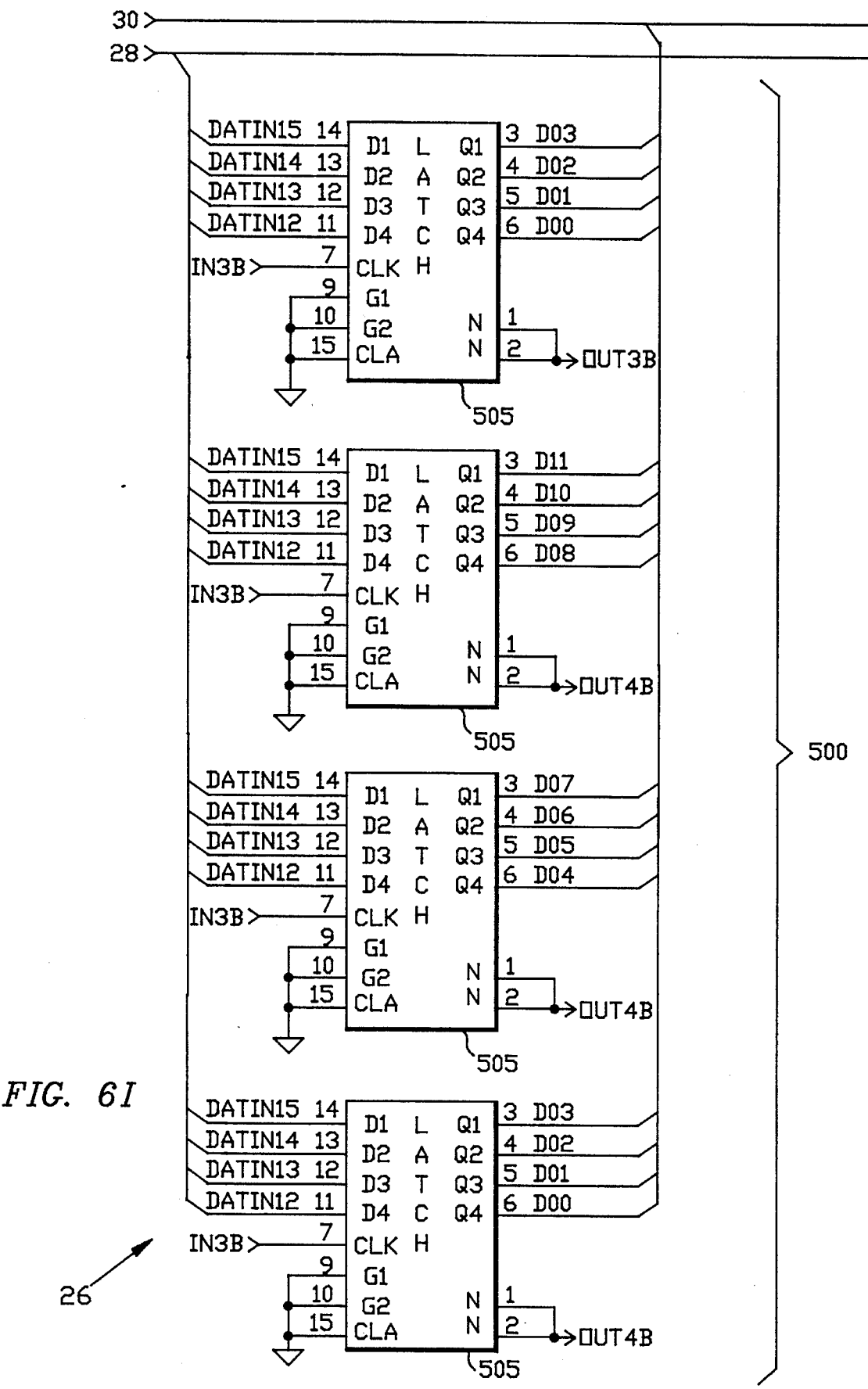
Figure 6J:
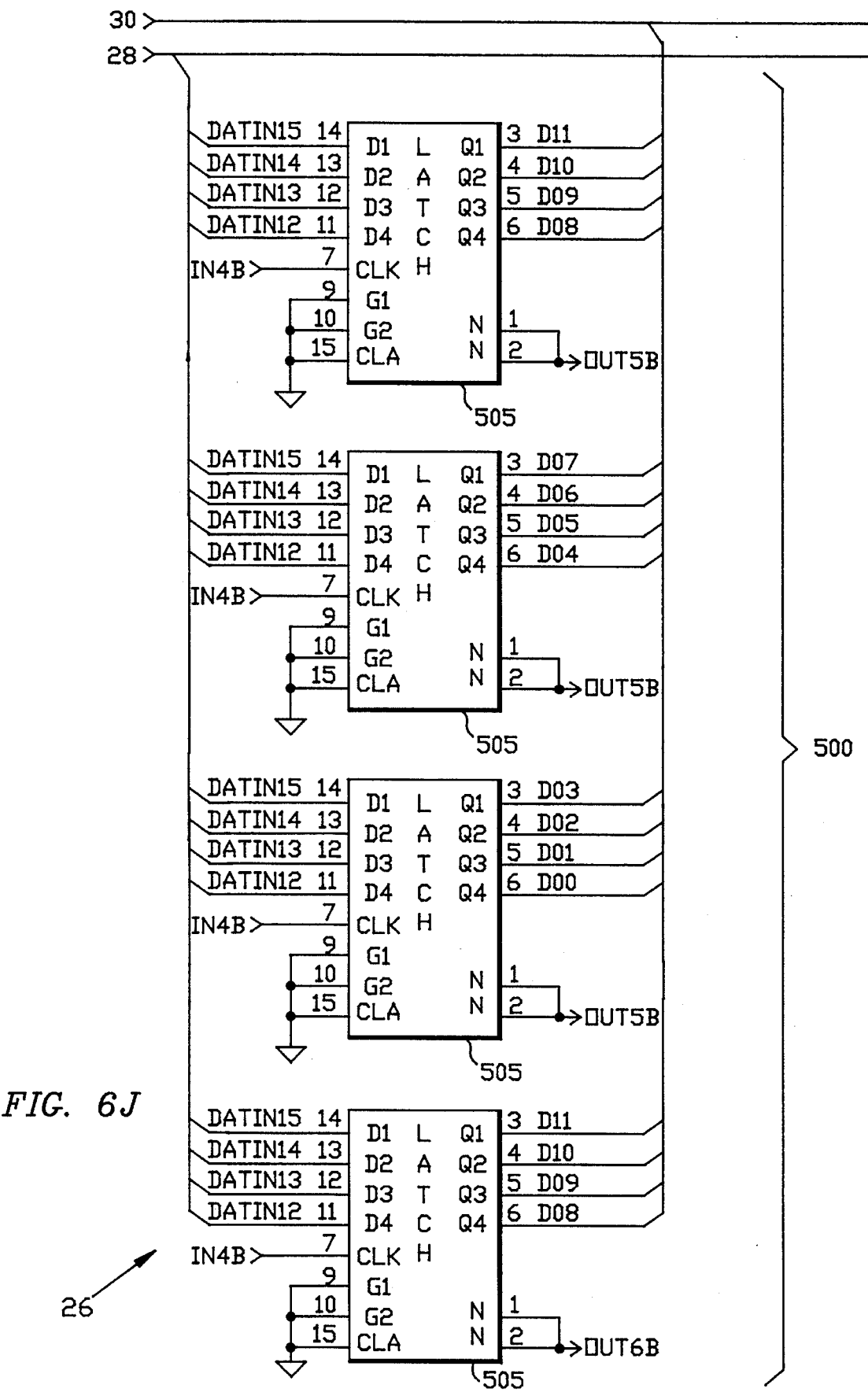
Figure 6K:
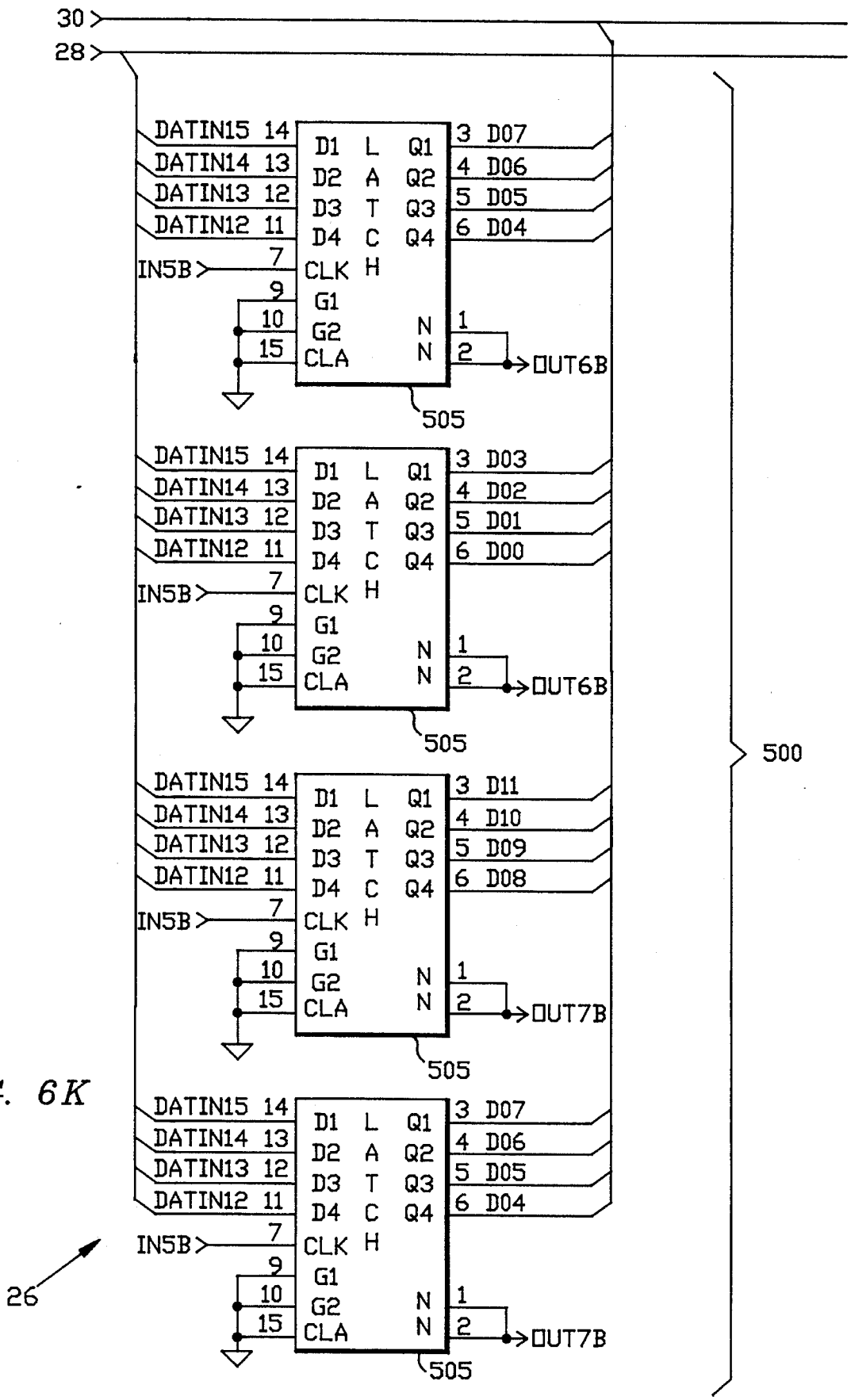
Figure 6L:
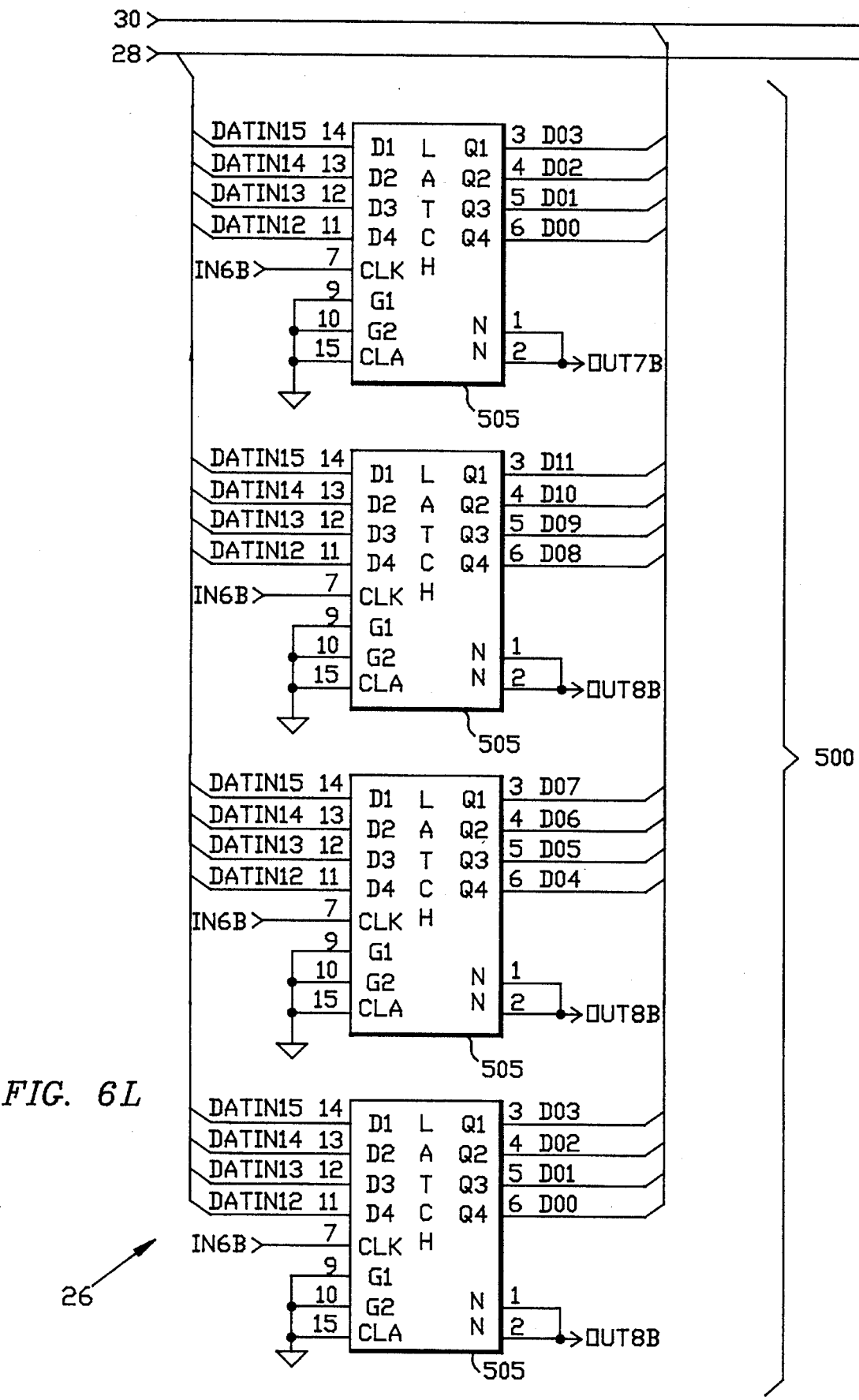

Output Selector:

Output selector 32 is described below with reference to FIG. 4. A "data request" signal is provided by peripheral device 15 through input 34 to invertor 402 and then to binary counter 404 (Part Number CD40193). Binary counter 404 outputs addresses on data address lines 400, sets the toggle strobe through output 23, and sets toggle select 35. The addresses presented on address lines 400 are provided to address decoders 412 and 414 (Part Number 74LS138), which output only one of address strobes 33 at a time. The "toggle select" signal 35 alternately enables address decoders 412 and 414. The enabled address decoder sequentially selects latches 505 of toggle buffer 26, shown in FIGS. 6A–6L, which input selector 12 previously caused to be filled. Each of the address strobes 33 is presented in turn to toggle buffer 26 in order to specify the location of the data that is to be output from data output 30 of toggle buffer 26. FIG. 5 is a conventional sequential logic timing diagram illustrating the sequence explained above for a complete cycle of buffering data comprised of eight 12-bit words.

FIGS. 6A, 6B, 6C, 6D, 6E, 6F, 6G, 6H, 6I, 6J, 6K and 6L collectively illustrate an example of toggle buffer 26, shown to include arrays 500 each having data latches 505 (Part Number 74LS173). In the specific embodiment described herein, latches 505 are arrayed into twelve groups of four latches each. However, it is to be understood that the scope of the invention also comprehends that toggle buffer 26 may be configured to include any number of arrays having any number of latches, as required to suit the requirements of a particular application. Input data, labeled as DATIN00-15 in the upper left hand corner of FIGS. 6A, 6B, 6C, 6D, 6E, 6F, 6G, 6H, 6I, 6J, 6K and 6L, is provided to all of data latches 505, repeating for every four latches as shown. Each latch 505 accommodates four bits of data. Output data, labeled as D00-11 in the upper left-hand corner of FIGS. 6A–6L, is operably coupled to data latch outputs 505, repeating for every three latches. In this example, where data having a width of 96-bits [six 16-bit words] is to be repacked, six latch arrays 500 of four 4-bit latches 505 each receive input data [6 words×1 array/word× 4 latches/array×4-bits/latch]. Input data is presented to all latches 505, but only the latches 505 of one of arrays 500 receiving an address strobe from the address strobes 17 (See FIGS. 1, 6A–6L) of input selector 12 will latch the data. Where as in this example, output data is repacked into eight 12-bit words. The latches 505 receive an address strobe from the selected decoder 412 or 414 and buffer data from output 30 of toggle buffer 26.

The consequence of this coupling of input and output data buses is that 16-bit wide data is repacked into 12-bit wide data. Other combinations of input and output widths may be achieved by reconfiguring the arrangement of latches to suit a particular application, a technique that would be obvious in light of these teachings.

Obviously, many modifications and variations of the present invention are possible in light of the above teachings. It is therefore to be understood that within the scope of the appended claims, the invention may be practiced otherwise than as specifically described.

I claim:

1. A circuit for transforming digital data from a first bus width to a second bus width, comprising:

a toggle buffer having a plurality of data latches for selectively latching said digital data having p1 words each having a q1 width, and for buffering said digital data as p2 words each having q2 bits, where p1q1=p2q2, and p1, p2, q1, and q2 are positive integers;

input selector means operably coupled to said toggle buffer for providing latching strobes to a first set of said latches for directing said first set of said latches to store said digital data to be stored as said p1 words, each said word having said q1 bits; and output selector means operably coupled to said toggle buffer for selectively enabling a second set of said latches to buffer said digital data as said p2 words, each said word having said q2 bits.

2. The circuit of claim 1 wherein:

said input selector means includes:
  a first address decoder for providing data storage addresses to said latches for storing said digital data in said toggle buffer; and
  a first counter for providing address strobes to said first address decoder; and said output selector includes:
  a second address decoder for providing addresses to said latches of said toggle buffer for buffering said digital data in said latches; and
  a second counter for providing address strobes to said second address decoder.

3. The circuit of claim 2 wherein:

said first counter is a binary counter operably disposed to provide said address strobes in response to receiving a "data ready" signal from a data source;

said first address decoder is comprised of third and fourth address decoders operably coupled to receive said address strobes from said binary counter and to selectively provide said data storage addresses to said toggle buffer;

and said circuit further includes:

an acknowledge latch operably coupled to alternately enable said third and fourth address decoders to output said data storage address strobes to said toggle buffer;

a NAND gate operably coupled to said third and fourth address decoders and to said acknowledge latch, for clocking said acknowledge latch when said binary counter has counted down to zero so as to disable said third and fourth address decoders to prevent overwriting said digital data stored in said toggle buffer;

a toggle latch operably disposed to receive a toggle strobe from said output selector means and operably coupled to said acknowledge latch; and a ready latch operably coupled to receive said data ready signal and operably coupled to said toggle latch such that when said toggle latch enables said ready latch, said ready latch resets said acknowledge latch, and said acknowledge latch resets said toggle latch and said ready latch, said ready latch being operably coupled to said acknowledge latch.

4. The circuit of claim 3 wherein:

said second address decoder of said output selector means further includes fifth and sixth address decoders; and said second counter of said output selector means is a binary counter.

5. A method for repacking data from one width to another, comprising the computer implemented steps of:

selectively latching digital data having p1 words into a toggle buffer, each word having q1 bits, where p1 and q2 are positive integers; and selectively buffering said digital data from said toggle buffer as p2 words, each word having q2 bits, where p1q1=p2q2, and p2 and q2 are positive integers.

6. The method of claim 5 wherein:

said step of latching includes providing address locations from an input selector to said toggle buffer in response to a data source providing a "data ready" signal to said input selector; and said step of buffering includes providing address locations from an output selector to said toggle buffer in response to a data receiver providing a "data request" to said output selector.

7. A circuit for transforming digital data from one bus width to another bus width, comprising:

a toggle buffer having a plurality of data latches for selectively latching a first series of m1-words of n1-bit digital data and for buffering a second series of m2-words of n2-bit digital data, where m1, n1, m2, and n2 are positive integers;

input selector means operably coupled to said toggle buffer for directing a first set of said latches to store said first series of m1-words of n1-bit digital data; and output selector means operably coupled to said toggle buffer for selectively enabling a second set of said latches to buffer said first series of m1-words of n1-bit digital data as said second series of m2-words of n2-bit digital data.

* * * * *